United States Patent
Sanders

(10) Patent No.: US 6,456,771 B1
(45) Date of Patent: Sep. 24, 2002

(54) OPTICAL FIBER WITH A PURE SILICA CORE HAVING A BRAGG GRATING FORMED IN ITS CORE AND A PROCESS FOR PROVIDING SAME

(75) Inventor: Paul E. Sanders, Madison, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/496,718

(22) Filed: Feb. 2, 2000

(51) Int. Cl.⁷ .................................................. G02B 6/02
(52) U.S. Cl. ........................................ 385/124; 385/37
(58) Field of Search ................................. 385/123, 124, 385/37, 126, 127

(56) References Cited

U.S. PATENT DOCUMENTS

| 5,430,817 A | * | 7/1995 | Vengsarkar | 385/123 |
| 5,949,934 A | * | 9/1999 | Shima et al. | 385/128 |
| 6,222,974 B1 | * | 4/2001 | Nagata | 385/129 |

OTHER PUBLICATIONS

K.O. Hill et al.,"Photosensitivity in Optical Fiber Waveguides: Application to Reflection Filter Fabrication," Appl. Phys. Lett. 32, 1978, pp. 647–649.

G. Meltz et al., "Formation of Bragg Gratings in Optical Fibers by a Transverse Holographic Method," Opt. Lett. 14, 1989, pp. 823–825.

T. Erdogan et al., "Decay of Ultraviolet–Induced Bragg Gratings," Appl. Phys. Lett. 76, 1994, pp. 73–80.

M.A. Fokine et al., "High Temperature Resistant Bragg Gratings Fabricated in Silica Optical Fibers," ACOFT, 1996, pp. 1–5.

* cited by examiner

Primary Examiner—Cassandra Spyrou
Assistant Examiner—Euncha Cherry
(74) Attorney, Agent, or Firm—Ware, Freesola, Van Der Sluys & Adolphson LLP

(57) ABSTRACT

A process for adapting a length of optical fiber with a pure silica core to enable imprinting a Bragg grating in the core without doping the core, the process using an optical fiber having some fluorine in its cladding, and besides the process, a pure silica core optical fiber having a Bragg grating. The process causes fluorine to diffuse from the cladding into the core for a selected length, and then by one of several alternative methods, creates defects in the core within the length. The alternatives include heating and reducing or oxidizing the length; performing flame brushing; or irradiating the length using ionizing radiation, such as gamma radiation. Next, the process uses hydrogenation to load the core with hydrogen, and then exposes the length to a pattern of UV light as is normally done in imprinting a Bragg grating. Finally, the process heats the length, causing hydrogen fluoride to form in the regions exposed to appreciable UV light. Since the hydrogen fluoride is volatile, it boils out of the optical fiber while the optical fiber is being heated. What remains is a length having a variation in concentration of fluorine, which is an index lowering agent, according to the pattern of UV light to which the length was exposed, or, in other words, a chemical (Bragg) grating.

20 Claims, 2 Drawing Sheets

OPTICAL FIBER WITH A PURE SILICA CORE HAVING A BRAGG GRATING FORMED IN ITS CORE AND A PROCESS FOR PROVIDING SAME

FIELD OF THE INVENTION

The present invention pertains to the field of optical fibers. More particularly, the present invention pertains to an optical fiber, including a pure silica core, having a Bragg grating formed in the core.

BACKGROUND OF THE INVENTION

According to the prior art, a Bragg grating in an optical fiber is usually created in the core region of the optical fiber, a core region typically of silica and containing germanium or other dopants so as to impart to it, by exposure to ultraviolet (UV) light, the photo-refractive structure known as a Bragg grating. See, e.g. K. O. Hill et al., "Photosensitivity In Optical Fiber Waveguides: Application To Reflection Filter Fabrication", Appl. Phys. Lett. 32, 1978, pp. 647–649; and G. Meltz et al., "Formation Of Bragg Gratings In Optical Fibers By A Transverse Holographic Method", Opt. Lett. 14, 1989, pp. 823–825.

Bragg gratings are generally produced in such a doped silica core of an optical fiber by laterally exposing the optical fiber to a three dimensional fringe pattern created by interfering holographically two coherent high intensity UV beams or by exposing the optical fiber to UV light passed through a diffractive optical element called a phase mask. The doped glass, by virtue of the lattice defects (in this case point imperfections) associated with the dopants, interacts with the bright portions of a UV pattern to produce light-absorbing color centers. Either technique produces a pattern of UV light consisting of alternating bright and dark regions. The doped glass interacts with the bright portions of the UV pattern in such a way that its refractive index is modified leaving a refractive index modulated according to the UV pattern.

Bragg gratings have been demonstrated in commercial telecommunications-grade optical fibers that contain germanium in the core (Corning SMF-28 for example). However, high levels of photosensitivity of these optical fibers is needed to achieve high reflectivity gratings and compatibility with manufacturing processes within reasonable exposure parameters. This has led to the use of hydrogenation, along with the development of special optical fibers containing high levels of germanium or other photosensitizing dopants, as a means to increase the number of defect centers to promote optical fiber photosensitivity. Pure silica core optical fibers, which contain little or no such defects, have been found unsuitable as a host material for forming Bragg gratings using UV exposure processes.

Pure silica core optical fibers however, are attractive in a number of applications due to their superior resistance to hydrogen-induced attenuation and to nonlinear effects. The hydrogen-induced attenuation is attributed to changes over time of energy levels of the doped glass structure; it is well known that UV-induced refractive index changes in "color center" Bragg gratings decay over time, at a rate depending on temperature, corresponding to the thermal depletion of lower energy trap states. (See, e.g. T. Erdogan et al., "Decay Of Ultraviolet-Induced Bragg gratings", Appl. Phys. Lett. 76, 1994, pp. 73–80.) Accelerated aging techniques (thermal annealing) are routinely employed as a means of providing stable grating performance. But if a Bragg grating could be provided in pure silica, aging would not be necessary. What is needed is a way of providing a Bragg grating in a pure silica core of an optical fiber, which would then not suffer from the drawbacks of Bragg gratings as provided by the prior art, namely by relying on doping the core.

The present invention builds on another approach besides accelerated aging to provide a stable Bragg grating. It forms a Bragg grating by providing in a target length of an optical fiber a periodic depletion (a sequence of alternating high and low concentrations) of an index-varying dopant in the core within the target length, thus providing an index modulation and corresponding Bragg resonance. As opposed to the "color center" type gratings whose index modulation is subject to decay across a wide temperature range, the gratings of the invention are stable to temperatures in excess of 500° C., where the glass network becomes mobile. (See M. A. Fokine et al., "High Temperature Resistant Bragg Gratings Fabricated In Silica Optical fibers", ACOFT, 1996.)

These gratings, called chemical gratings (as opposed to color center gratings formed by exposure of doped silica to UV light), rely on the presence of (point) defect sites that lead to hydroxyl formation. Chemical gratings are formed in a three-step process:

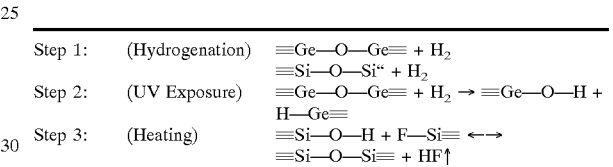

In the first step, a special fluorine-codoped germanium silicon (Ge—Si) single-mode optical fiber is hydrogenated. The hydrogen loaded optical fiber then undergoes a typical UV exposure used to write traditional Bragg gratings, i.e. it is exposed to an interference or diffraction pattern of UV light. In those portions of the optical fiber exposed to UV light, as opposed to those portions exposed to only low intensity UV light (or to no UV light at all), the UV light causes a photochemical reaction in which the free hydrogen migrates to defect sites (primarily from the Ge dopant) and forms hydroxyl. The optical fiber is then heated causing atomic fluorine (F) in the presence of hydroxyl (OH) to form (volatile) hydrogen fluoride (HF), which then thermally diffuses rapidly out of the optical fiber. Because the optical fiber is exposed to spatially varying amounts of UV radiation, the hydroxyl formation, and thus HF concentration, will also vary according to the UV exposure pattern. Therefore, the fluorine depletion from the out-diffusion of HF will follow the pattern, leading to a refractive index modulation where fluorine depleted sections exhibit a higher refractive index (by virtue of fluorine being an index-lowering dopant). This reaction can be observed by monitoring the optical spectrum of the grating during these steps. After the UV exposure, a "first" grating appears. Upon the heating step and the subsequent chemical reaction, the "first" grating is erased prior to the formation and appearance of the "chemical" grating.

Fluorine in low concentrations is commonly used by the optical fiber industry as an index lowering dopant in providing cladding glasses. Recently, chemical gratings have been formed in commercial optical fibers, by thermally diffusing the fluorine present in the optical cladding region into the core region of the optical fiber. Applying this diffusion technique can eliminate the requirement for a special fluorine-doped core optical fiber. A process for making chemical gratings in commercial optical fibers with fluorinated cladding regions has been demonstrated ( M. A. Fokine and R. Stubbe, Private Correspondence, Sep. 30, 1998) that is identical to the original process, except for the addition of a fluorine diffusion step, as shown below.

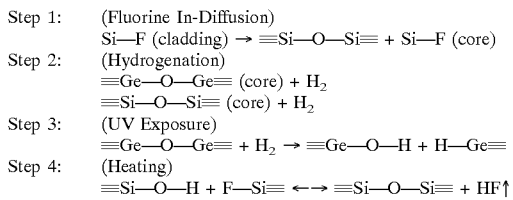

| Step 1: | (Fluorine In-Diffusion) |
| | Si—F (cladding) → ≡Si—O—Si≡ + Si—F (core) |
| Step 2: | (Hydrogenation) |
| | ≡Ge—O—Ge≡ (core) + $H_2$ |
| | ≡Si—O—Si≡ (core) + $H_2$ |
| Step 3: | (UV Exposure) |
| | ≡Ge—O—Ge≡ + $H_2$ → ≡Ge—O—H + H—Ge≡ |
| Step 4: | (Heating) |
| | ≡Si—O—H + F—Si≡ ←→ ≡Si—O—Si≡ + HF↑ |

In this modified process, a commercial Ge-doped optical fiber is used. The presence of the Ge dopant provides a suitable population of defect sites to form hydroxyl in the presence of hydrogen, during UV exposure.

This process, without more, is not suitable for providing chemical gratings in pure silica core optical fibers because of the lack of a suitable number of defect sites in pure silica. What is needed is a way of providing a suitable number of defect sites in pure silica, without doping, and so adapting a pure silica material so that it is suitable for writing a Bragg grating that would then be stable (against aging) because of not relying on dopants in the core.

SUMMARY OF THE INVENTION

Accordingly, the present invention provides a method for adapting an optical fiber that has a substantially pure silica core, so as to enable imprinting a Bragg grating in the core, and an optical fiber having the properties that result from the method. The method includes the steps of: providing an optical fiber having a silica core substantially free of dopants, and having a fluorine-bearing cladding; selecting a length of the optical fiber; performing a fluorine in-diffusion step by heating the selected length of optical fiber so as to influence the fluorine in the cladding to diffuse into the core and bond with silicon in the core; performing a defect creation step throughout the length of the optical fiber, by causing changes in the silicon-fluorine bond; performing a step of hydrogenation of the length of the optical fiber so as to introduce hydrogen into the core; exposing the length of the optical fiber to a pattern of ultraviolet (UV) light alternating in high and low intensity, so as to promote forming hydroxyl bonded to silicon in the parts of the length exposed to the high intensity UV light; and heating the length of the optical fiber so as to cause a reaction producing hydrogen fluoride and to volatilize the hydrogen fluoride. The method creates in the core of the optical fiber alternating regions of relatively high and relatively low index of refraction. Thus, the method creates an optical fiber having a silica core substantially free of dopants except in a selected length; a fluorine-bearing cladding; and the selected length of the optical fiber bearing atomic fluorine in a concentration that varies periodically along the selected length.

In a further aspect of the invention, the defect creation step is performed by heating the length of optical fiber and exposing it to a chemical agent that is either an oxidizing agent or a reducing agent.

In another aspect of the invention, the defect creation step includes performing hydrogen flame brushing.

In yet another aspect of the invention, the defect creation step is performed by exposing the length of the optical fiber to ionizing radiation.

The present invention yields, for the first time, Bragg gratings in pure silica core optical fibers. Such optical fibers have demonstrated advantageous resistance to a number of environmental and nonlinear effects, resistance that is often superior to that of doped-core optical fibers, especially commercial doped core optical fibers.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The present invention provides pure silica core optical fiber having a Bragg grating written in a length of its core, by introducing an intermediate step in the chemical grating process described above, a step that creates a suitable population of defects in a pure silica glass core material, and leads to creation of a chemical grating.

Figure 1:
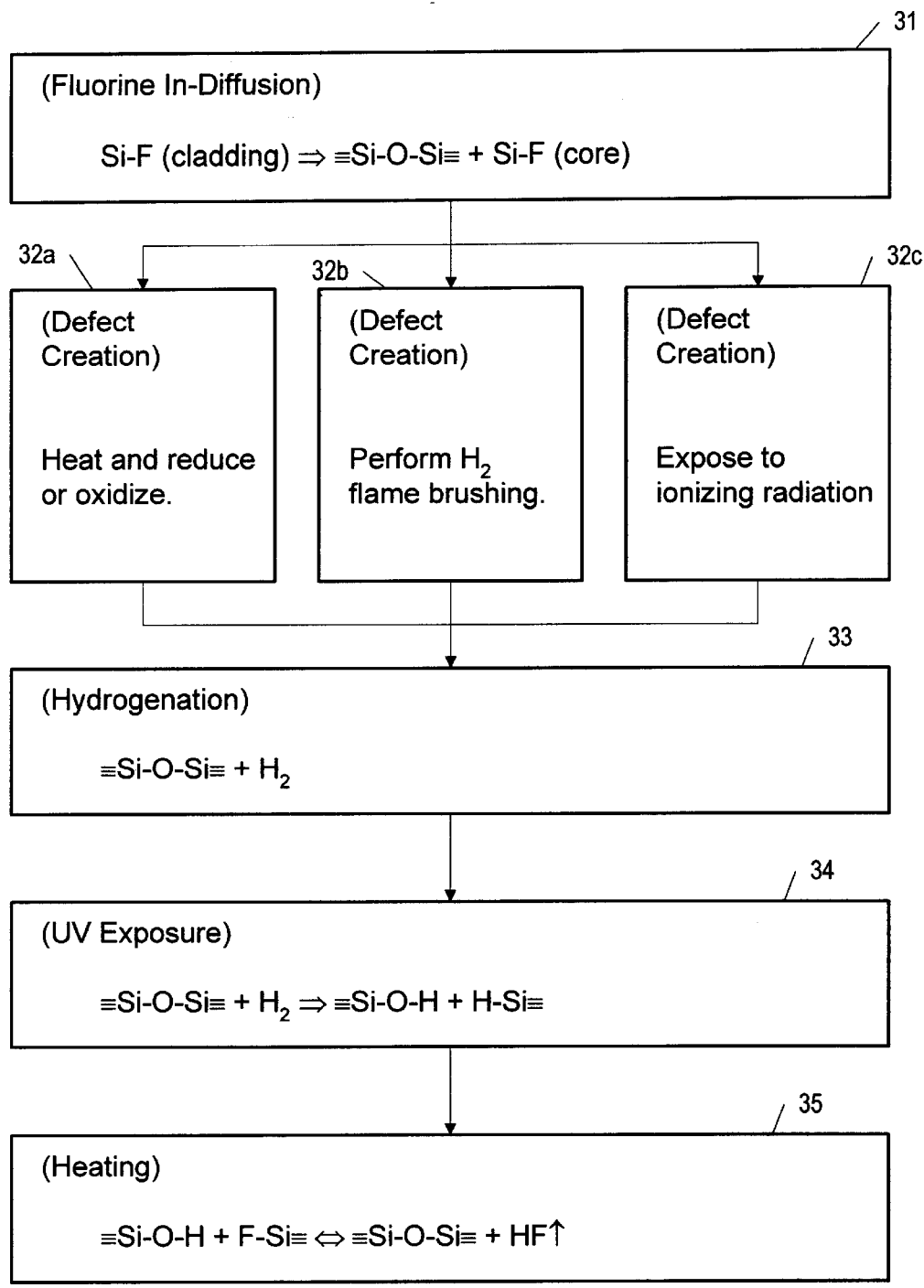
FIG. 1 is a process diagram illustrating the process, according to the present invention, by which defect sites are provided in a pure silica core of an optical fiber.

Referring now to FIG. 1, a process for adapting a length of pure silica core 41 (FIGS. 2 and 3) of an optical fiber 40 (FIG. 2 and 3) having a fluorine bearing cladding 42 (FIGS. 2 and 3) to serve as a medium for a Bragg grating includes a fluorine in-diffusion step 31 in which fluorine, used in low concentrations in the cladding to lower the index of the cladding relative to the core, is caused to diffuse into the pure silica core by heating the optical fiber. In a next, defect creation step 32a–c, the optical fiber section to be processed is exposed to one of three treatments for creating defects within the target section. In the preferred treatment, an optical fiber is heated to a temperature where the glass network becomes mobile (>900° C.), and a predetermined mixture of either oxidizing or reducing gases in the process heat zone is introduced. This treatment can be applied during or after the fluorine in-diffusion step. An alternate treatment involves hydrogen flame brushing of the target optical fiber section prior to hydrogenation. Other treatments involve exposure of the target optical fiber section to ionizing radiation, such as gamma radiation.

In a next, hydrogenation step 33, the optical fiber is hydrogenated. Then, in a next, UV exposure step 34, the optical fiber is exposed to UV light, according to the prior art, so as to write a Bragg grating in the optical fiber, i.e. so that some length of the optical fiber is exposed to an interference or diffraction pattern of UV light. In those portions of the optical fiber exposed to UV light, as opposed to those portions exposed to only low intensity UV light (or to no UV light at all), the UV light causes a photochemical reaction in which the free hydrogen migrate to defect sites and form hydroxyl. Then, in a last, heating step 35, the optical fiber is heated so as to cause fluorine in the presence of hydroxyl to form hydrogen fluoride (HF), which is volatile and diffuses out of the optical fiber under the influence of the heating.

Figure 2:
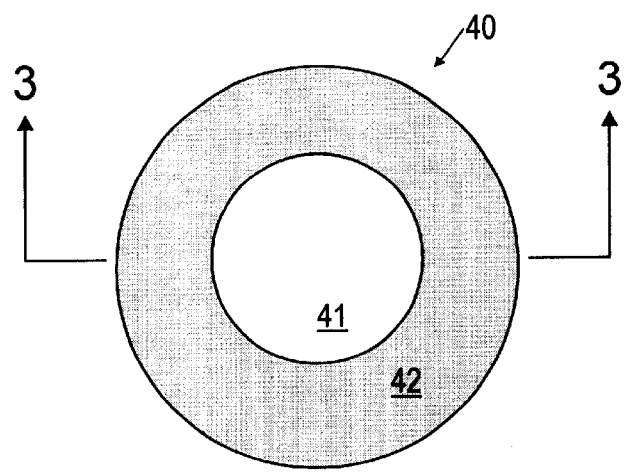
FIG. 2 is a transverse cross section of an optical fiber having a core and a cladding.
Figure 3:
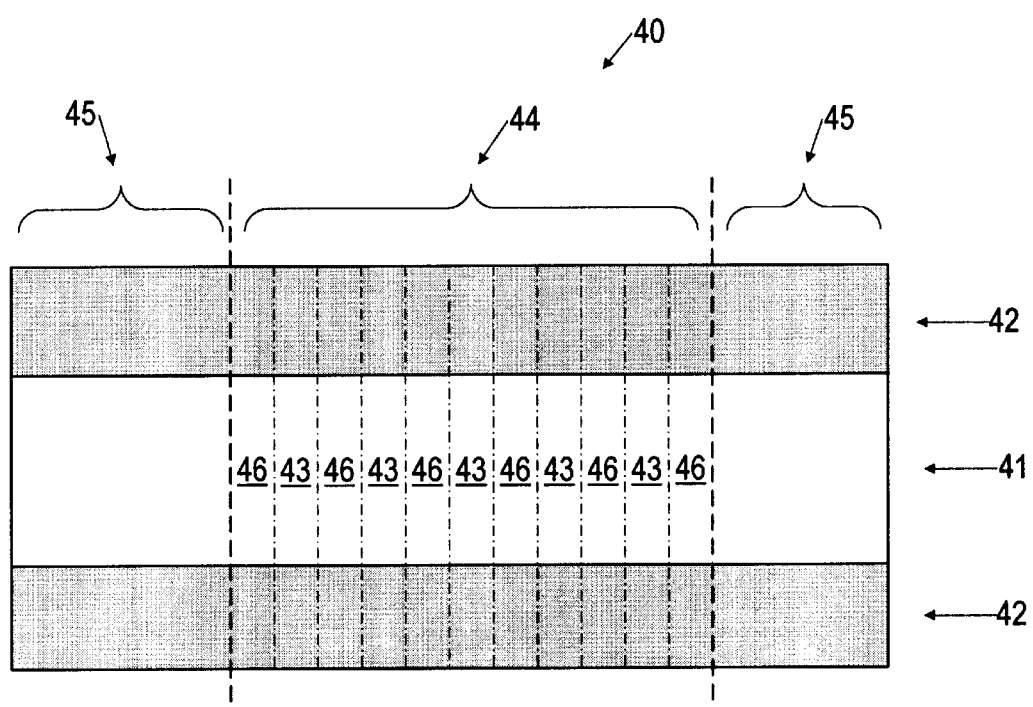
FIG. 3 is a longitudinal cross section of the optical fiber of FIG. 2, showing a length of an optical fiber having a Bragg grating inscribed in its core according to the present invention.

Referring now to FIGS. 2 and 3, a section of an optical fiber 40, a portion 44 of which is treated according to the process of the present invention, is shown first in transverse cross section (FIG. 2) and then in longitudinal cross section (FIG. 3). After the fluorine in-diffusion step, and before exposure to UV light and the subsequent heating, both the core and cladding of the entire portion 44 include fluorine. After exposure to a pattern of UV light and the subsequent heating, some regions 43 of the portion 44 are depleted of fluorine and therefore have a higher index than those regions 46 not exposed to the bright areas of the pattern of UV light. The regions 43 depleted of fluorine have an index of refraction that is substantially similar to the part 42 of the optical fiber within the treated portion 44. This will tend to homogenize these section and erase the optical waveguide. However, light will still propagate through the fiber along this short section, because it is so short. Thus, the core 41, within the treated portion 44, includes regions 46 bearing fluorine and thus having a lower index of refraction (by virtue of fluorine being an index-lowering dopant) than the rest of the core 41, and it is the alternation between the fluorine bearing regions 46 and the non-fluorine bearing regions 43 that constitutes the Bragg grating.

In the defect creation step, a radiation source (not shown) directs a radiation stream (not shown) onto the selected length 44 of the optical fiber 40. Glass defects confirmed by electron spin resonance (ESR) spectroscopy formed by exposure to gamma radiation, such as provided in the decay of the isotope $Co^{60}$, have been widely studied in glass fibers. Radiation exposure for the defect creation step according to the present invention is typically in the range from approximately 10 krad to 1 Mrad. Other radiation sources besides gamma radiation sources can also be used in the present invention, including high energy neutron or x-ray sources.

By this process, with either of the three alternative defect creation steps, a pure silica core of an optical fiber can be adapted so as to enable forming a chemical (Bragg) grating in the core. Suitable optical fibers include commercial silica core optical fibers, such as Sumitomo Electric Industries "Z" type single-mode optical fibers.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. An optical fiber, comprising:
   a cladding having an index-lowering dopant; and
   a silica core disposed within the cladding, the core being substantially free of dopants except in a selected length of the core;
   wherein the selected length of the core includes the index-lowering dopant in a concentration that varies the index of refraction along the selected length of the core.

2. The optical fiber of claims 1, wherein the index-lowering dopant is fluorine.

3. The optical fiber of claim 1, wherein the variation of concentration of the index-lowering dopant forms a Bragg grating.

4. The optical fiber of claim 1, wherein the selected length is sufficiently short to propagate light through the selected length of the core.

5. The optical fiber of claim 1, wherein the selected length of the core includes the index-lowering dopant that is diffused from the cladding to the selected length of the core.

6. The optical fiber of claim 1, wherein the selected length of the core includes defects.

7. The optical fiber of claim 6, wherein the selected length of the core includes defects created by heating the selected length of the core to a predetermined temperature and introducing at least one of a reducing gas or oxidizing gas.

8. The optical fiber of claim 6, wherein the selected length of the core includes defects created by hydrogen flame brushing the selected length of the core.

9. The optical fiber of claim 6, wherein the selected length of the core includes defects created by exposing the selected length of the core to ionizing radiation.

10. The optical fiber of claim 1, wherein the selected length of the core is hydrogenated.

11. The optical fiber of claim 1, wherein the periodicity of the concentration of the index-lowering dopant is provided by exposing a pattern of ultraviolet light onto the selected length of the core.

12. The optical fiber of claim 1, wherein the periodicity of the concentration of the index-lowering dopant is provided by diffusing the index-lowering dopant from the selected portion of the core.

13. An optical fiber comprising:
    a cladding having an index-lowering dopant; and
    a silica core disposed within the cladding, the core being substantially free of dopants except in a selected portion of the core;
    wherein an index-lowering dopant is disposed within the selected portion of the core in a concentration that varies the index of refraction periodically along the selected portion of the core by diffusing the index-lowering dopant from the cladding to the selected portion of the core, creating defects within the selected portion of the core, hydrogenating the selected portion of the core, exposing the selected portion of the core by a pattern of ultraviolet light and diffusing index-lowering dopant from the selected portion of the core.

14. The optical fiber of claim 13, wherein the index-lowering dopant is fluorine.

15. The optical fiber of claim 13, wherein the variation of the concentration of the index-lowering dopant forms a Bragg grating.

16. An optical fiber comprising:
    a cladding having an index-lowering dopant; and
    a silica core disposed within the cladding, the core being substantially free of dopants except in a selected portion of the core;
    wherein an index-lowering dopant is disposed within the selected portion of the core in a concentration that varies the index of refraction along the selected portion of the core by diffusing the index-lowering dopant from the cladding to the selected portion of the core.

17. The optical fiber of claim 16, wherein the index-lowering dopant is fluorine.

18. The optical fiber of claim 16, wherein the variation of the concentration of the index-lowering dopant forms a Bragg grating.

19. The optical fiber of claim 16, wherein the selected portion of the core includes created defects.

20. The optical fiber of claim 19, wherein the periodicity of the concentration of the index-lowering dopant is provided by exposing a pattern of ultraviolet light onto the selected portion of the core.

* * * * *

UNITED STATES PATENT AND TRADEMARK OFFICE
CERTIFICATE OF CORRECTION

PATENT NO.   : 6,456,771 B1                                                    Page 1 of 1
DATED        : September 24, 2002
INVENTOR(S)  : Paul E. Sanders It is certified that error appears in the above-identified patent and that said Letters Patent is hereby corrected as shown below:

<u>Column 2,</u>
Line 28, "'" after "Si" should be -- ≡ --.

Signed and Sealed this

Eighteenth Day of February, 2003

JAMES E. ROGAN
*Director of the United States Patent and Trademark Office*